(12) United States Patent
Roos et al.

(10) Patent No.: US 10,118,621 B2
(45) Date of Patent: Nov. 6, 2018

(54) METHOD AND SYSTEM FOR CONTROL OF TEMPERATURE OF AN EXHAUST AFTERTREATMENT SYSTEM

(71) Applicant: SCANIA CV AB, Södertälje (SE)

(72) Inventors: Fredrik Roos, Segeltorp (SE); Elvedin Ramic, Åkers Styckebruk (SE)

(73) Assignee: SCANIA CV AB, Södertälje (SE)

( * ) Notice: Subject to any disclaimer, the term of this patent is extended or adjusted under 35 U.S.C. 154(b) by 83 days.

(21) Appl. No.: 15/110,071

(22) PCT Filed: Jan. 13, 2015

(86) PCT No.: PCT/SE2015/050017
§ 371 (c)(1),
(2) Date: Jul. 6, 2016

(87) PCT Pub. No.: WO2015/108472
PCT Pub. Date: Jul. 23, 2015

(65) Prior Publication Data
US 2016/0332631 A1    Nov. 17, 2016

(30) Foreign Application Priority Data
Jan. 15, 2014  (SE) ...................................... 1450031

(51) Int. Cl.
*B60W 10/06*     (2006.01)
*B60W 10/11*     (2012.01)
(Continued)

(52) U.S. Cl.
CPC ...... *B60W 30/18136* (2013.01); *B60W 10/06* (2013.01); *B60W 10/11* (2013.01);
(Continued)

(58) Field of Classification Search
CPC .... B60W 10/06; B60W 10/11; B60W 10/184; B60W 10/196; B60W 10/198;
(Continued)

(56) References Cited

U.S. PATENT DOCUMENTS

| 2008/0010987 A1 | 1/2008 | Benz et al. | |
| 2009/0118969 A1* | 5/2009 | Heap ...................... | B60K 6/365 |
| | | | 701/102 |

(Continued)

FOREIGN PATENT DOCUMENTS

| JP | H08482434 | 2/1996 |
| WO | 2004108467 A1 | 12/2004 |

(Continued)

OTHER PUBLICATIONS

International Search Report for PCT/SE2015/050017 dated Nov. 5, 2015.

(Continued)

*Primary Examiner* — Edwin A Young
(74) *Attorney, Agent, or Firm* — Moore & Van Allen PLLC; W. Kevin Ransom

(57) ABSTRACT

The present invention provides a method and system arranged for control of at least one temperature $T_{exhaust}$ for an exhaust treatment system in a vehicle. The system comprises a first determination unit arranged for the determination of the at least one temperature $T_{exhaust}$ for the exhaust treatment system. The system also comprises a second determination unit arranged for the determination of an order of priority for the use of brakes in the vehicle. These brakes comprise at least the service brakes and the auxiliary brakes, the auxiliary brakes in turn comprising at least one engine fitted auxiliary brake, which is fitted in connection with an exhaust stream through the exhaust treatment system. The order of priority is determined based on the at least (Continued)

Figure 1:
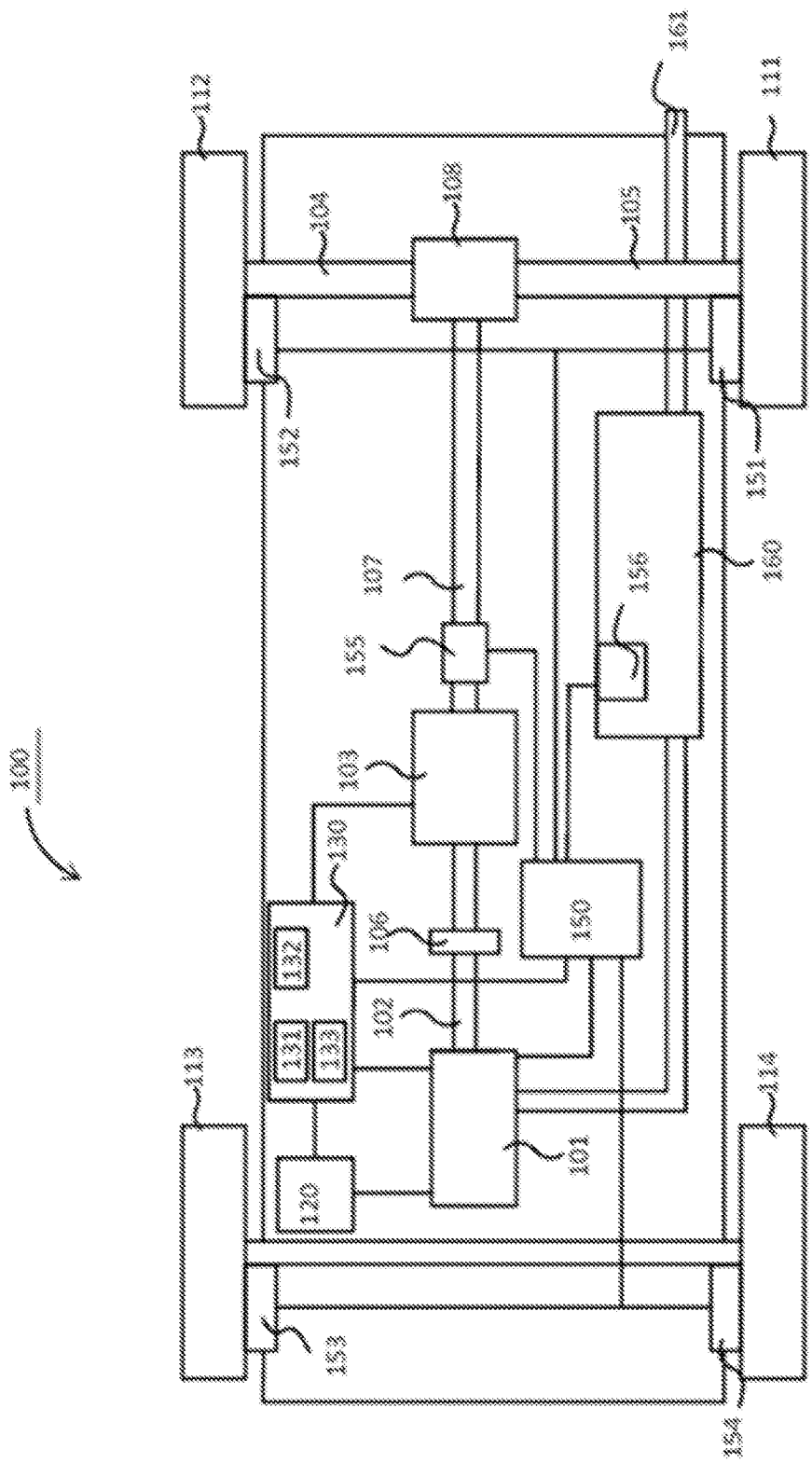

one temperature $T_{exhaust}$. The system also comprises an utilization unit arranged for the use of the determined order of priority at braking of the vehicle.

26 Claims, 4 Drawing Sheets

(51) Int. Cl.
  *B60W 10/18* (2012.01)
  *B60W 30/18* (2012.01)
  *B60W 10/184* (2012.01)
  *B60W 10/198* (2012.01)
  *B60W 10/196* (2012.01)
  *F01N 11/00* (2006.01)

(52) U.S. Cl.
  CPC ........ *B60W 10/184* (2013.01); *B60W 10/196* (2013.01); *B60W 10/198* (2013.01); *F01N 11/002* (2013.01); *B60W 2510/068* (2013.01); *B60W 2710/0694* (2013.01); *B60W 2710/10* (2013.01); *B60W 2710/18* (2013.01); *Y02T 10/54* (2013.01)

(58) Field of Classification Search
  CPC ..... B60W 30/18136; B60W 2510/068; B60W 2710/0694
  See application file for complete search history.

(56) References Cited

U.S. PATENT DOCUMENTS

2010/0043404 A1   2/2010   Hebbale et al.
2013/0099561 A1*  4/2013   Raman ...................... B60L 1/02
                                                     307/9.1
2013/0231842 A1*  9/2013   Hammer ............... B60W 20/00
                                                     701/102
2014/0358400 A1* 12/2014   Whitney ............. B60W 10/198
                                                     701/102

FOREIGN PATENT DOCUMENTS

| WO | WO2010059108 A1 | 5/2010 |
| WO | 2010110700 A1 | 9/2010 |
| WO | 2013007497 A1 | 1/2013 |
| WO | 2013007028 A1 | 5/2013 |
| WO | 2013066242 A1 | 5/2013 |
| WO | 2013077028 A1 | 5/2013 |
| WO | 2014051496 A1 | 4/2014 |

OTHER PUBLICATIONS

Written Opinion of the International Searching Authority for PCT/SE2015/050017 dated Nov. 5, 2015.
Korean Office Action for Korean Patent Application No. 10-2016-7021881 dated Mar. 27, 2018.
European Search Report for PCT/SE2015/050017 dated Sep. 13, 2017.
Supplementary European Search Report for PCT/SE2015/050017 dated Sep. 13, 2017.
International Preliminary Report on Patentability for PCT/SE2015/050017 dated Jul. 19, 2016.

\* cited by examiner

METHOD AND SYSTEM FOR CONTROL OF TEMPERATURE OF AN EXHAUST AFTERTREATMENT SYSTEM

CROSS REFERENCE TO THE APPLICATION

This application is a national stage application (filed under 35 § U.S.C. 371) of PCT/SE15/050017, filed Jan. 13, 2015 of the same title, which, in turn claims priority to Swedish Application No. 1450031-8, filed Jan. 15, 2014 of the same title; the contents of each of which are hereby incorporated by reference.

FIELD OF THE INVENTION

The present invention relates to a method, system, and computer program product for control of at least one temperature $T_{exhaust}$ for an exhaust treatment system.

BACKGROUND OF THE INVENTION

The following background description constitutes a description of the background to the present invention, and thus need not necessarily constitute prior art.

Engines, such as for example engines comprised in vehicles or ships, are usually equipped with an exhaust purification system which is arranged to purify exhausts from an engine in the vehicle.

There is a number of threshold values for emission levels of particles, substances and/or compounds, which have been established by authorities. Vehicles must comply with these emission levels in order to travel on the roads. Additionally, vehicle owners and/or drivers are also environmentally aware, and keen to avoid emitting more exhausts than necessary when a vehicle is used. It is therefore important that the exhaust treatment system may purify the exhaust stream from the engine efficiently before it is released into the surrounding air.

BRIEF DESCRIPTION OF THE INVENTION

The function of certain components in the exhaust treatment system is dependent on its temperature. For example, a reduction catalyst device (such as an SCR-catalyst) reduces the fraction of nitrogen oxides $NO_x$ more efficiently when the SCR-catalyst is warm, than when it is cold.

At cold starts, or in driving modes which cool down the exhaust treatment system, the SCR-catalyst, for example, provides a poor reduction of nitrogen oxides $NO_x$, which entails a risk that the vehicle may not meet the emission standards applicable to the vehicle. There are several driving modes entailing a risk that low temperatures in the exhaust treatment system may negatively impact the exhaust purification. Typically, driving modes with a small or no fuel injection to the engine result in a cooling of the system, since the exhaust flow passing through the exhaust treatment system mainly consists of cold air that cools down the components in the exhaust treatment system.

Dragging of the engine, also called engine braking of the vehicle, when the vehicle is driven forward by its kinetic energy with a closed power-train and without fuel being injected into the engine, is an example of a driving mode, where there is a risk that the components in the exhaust treatment system may be cooled down. Normal braking is another driving mode entailing a risk that the components in the exhaust treatment system may be cooled down, since very little fuel is injected into the engine. Also in the coasting driving mode, when the vehicle is rolling forward with an open power-train, such as with the gearbox in a neutral gear or with an open clutch, very little fuel is injected into the engine, so that there is a risk that the exhaust treatment system may be too cold to efficiently purify the exhaust stream from the engine.

When the vehicle, after a driving mode that cools down the exhaust treatment system, transitions into a driving mode where more fuel is injected into the engine, so that more exhausts are consequently formed, the exhaust treatment system is often too cold to be able to purify these exhausts efficiently.

A city bus can be mentioned as a non-limiting example of a problematic use of vehicles in this regard. A city bus has relatively many starts and stops when driven. Such driving of the bus entails that the bus driver often brakes and/or engine brakes before bus stops, for example, and the exhaust treatment system is then cooled down. After stopping at the bus stop, the bus is accelerated to drive on, and a lot of fuel is then injected in the engine, while the exhaust treatment system is too cold to be able to efficiently handle the exhaust flow resulting from such acceleration.

In prior art solutions, the temperature of the exhaust treatment system has been prevented from dropping too low by actively heating the exhaust treatment system. Such active heating has been achieved by injecting extra fuel at for example idling, so that the extra fuel is burned and creates heat. Accordingly, previously a bus, for example, would first brake and/or engine brake before a bus stop, and the exhaust treatment system would then be cooled down, and subsequently the exhaust treatment system of the bus would be actively heated by way of extra fuel injection while the bus is idling at the bus stop, following which the bus would accelerate after the bus stop, and the exhaust treatment system, because of the active heating, would have a temperature which is suitable for exhaust purification. These prior art solutions may hence provide acceptable exhaust purification, but at the cost of extra fuel consumption. In other words the prior art exhaust purification is not energy efficient. Energy is created in the vehicle by way of the combustion in the engine, which means non-energy efficient solutions increase fuel consumption. The extra fuel consumption is costly and also contributes to emissions, for example of carbon monoxide $CO_2$, from the vehicle.

It is therefore one objective of the present invention to provide a method and a system for control of at least one temperature $T_{exhaust}$ for an exhaust treatment system in a vehicle, which at least partly resolves the above mentioned problem.

According to the present invention at least one temperature $T_{exhaust}$ for the exhaust treatment system is determined. A priority order for the use of brakes in the vehicle is also determined. The brakes, in relation to which an order of priority is determined, comprise at least service brakes and auxiliary brakes, where such auxiliary brakes comprise at least one engine fitted auxiliary brake, which is fitted in connection with an exhaust stream through the exhaust treatment system. According to the present invention the order of priority is determined based on the at least one temperature $T_{exhaust}$. Subsequently, the determined order of priority is used at braking of the vehicle.

The use of the at least one engine fitted auxiliary brake heats the exhaust stream, which, in turn, heats the components in the exhaust treatment system. By changing the order of priority for the use of the brakes in the vehicle, a reliable control of at least one temperature $T_{exhaust}$ for the exhaust treatment system may be provided. Thus, a favorable operating temperature for the exhaust treatment system and its components may be achieved, providing a more efficient purification of the exhaust stream from the engine, passing through the exhaust treatment system. A lower fuel consumption is also obtained as a result.

Overall, with the use of the present invention, lower emissions are obtained from the vehicle since the components in the exhaust treatment system may operate at suitable temperatures, which means that the efficiency of the exhaust treatment system's components increases.

In order to ensure a performance for the exhaust treatment system and to prevent inconsistent control, according to one embodiment the at least one engine fitted auxiliary brake may only be used if this means that the exhaust stream obtains, through such use, a favorable exhaust flow and/or a favorable exhaust stream temperature $T_{exhaust\_stream}$.

In order to ensure safe driving of the vehicle, and also to provide a system which is intuitively acceptable to the driver, according to one embodiment the control of the at least one temperature $T_{exhaust}$ may only be carried out in such a way that a provided total braking energy from the engine fitted auxiliary brake is lower than the total braking energy requested by the driver or the control system.

BRIEF LIST OF FIGURES

Figure 2:
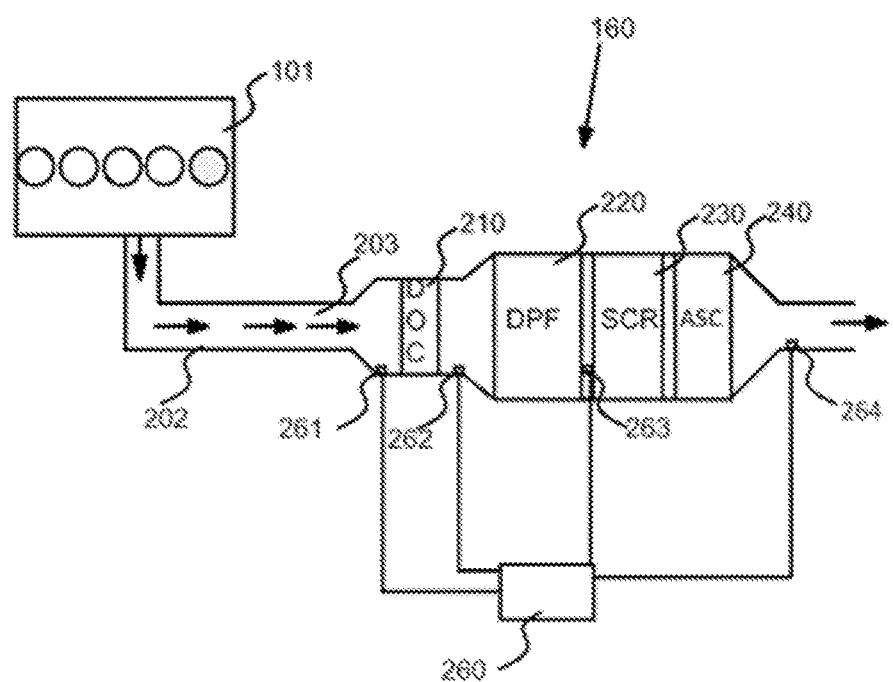
Figure 3:
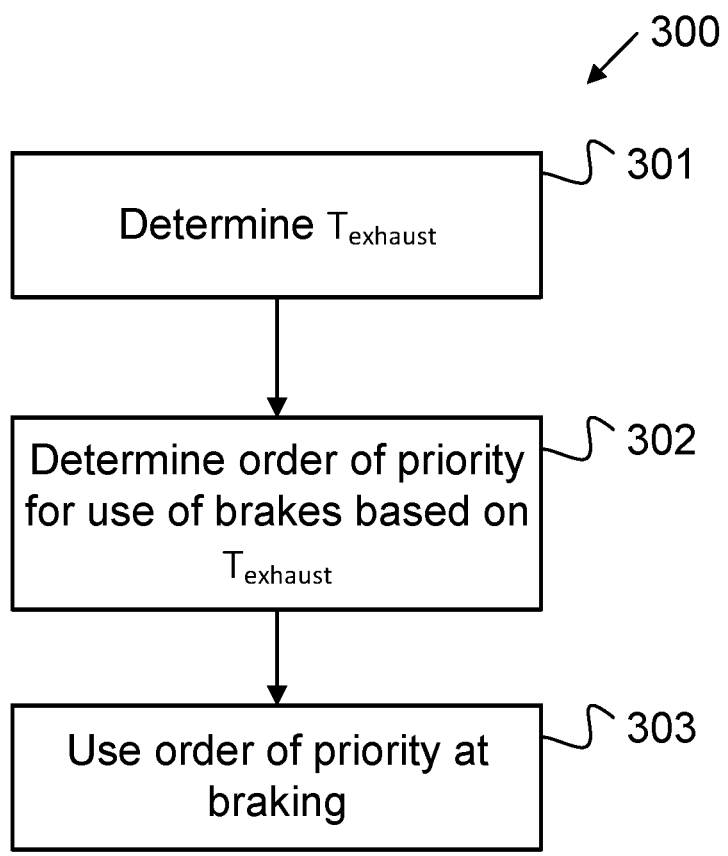

The invention will be illustrated in more detail below, along with the enclosed drawings, where similar references are used for similar parts, and where:

FIG. 1 schematically shows an example vehicle,

FIG. 2 schematically shows an example of an exhaust treatment system,

FIG. 3 shows a flow chart, and

Figure 4:
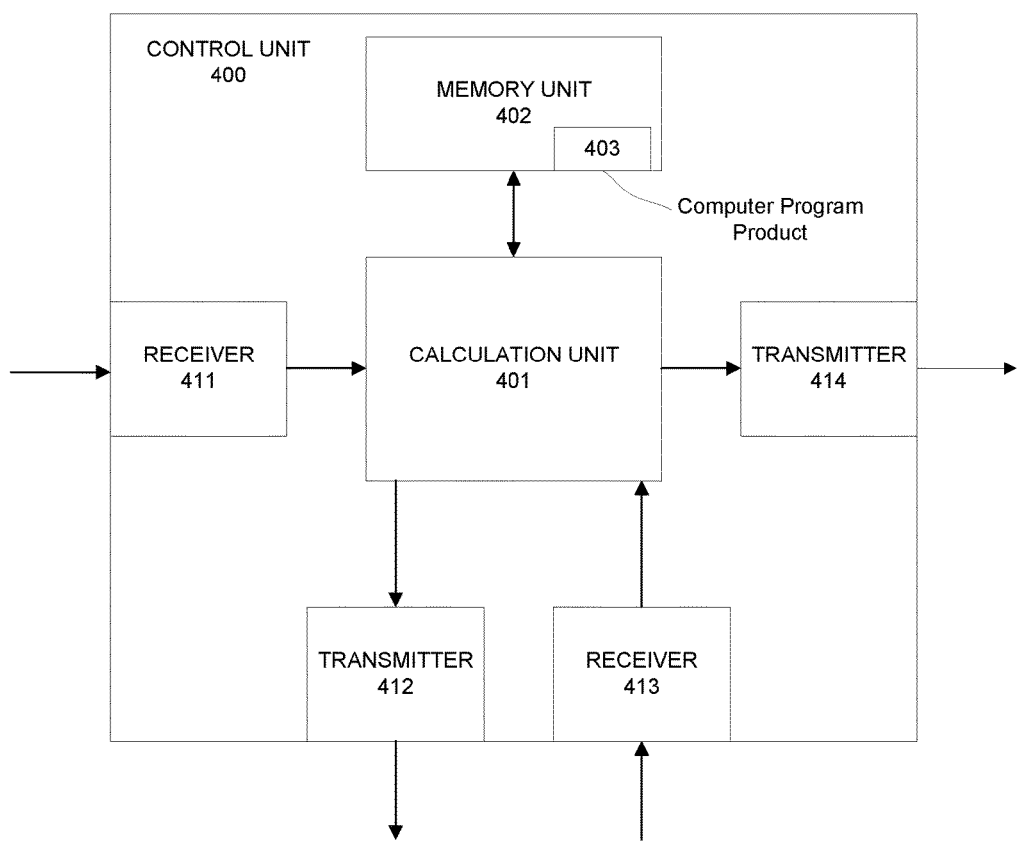

FIG. 4 schematically shows a control device.

DESCRIPTION OF PREFERRED EMBODIMENTS

FIG. 1 schematically shows a vehicle 100 in which the present invention may be implemented. The vehicle 100 comprises a power-train. The power-train comprises a combustion engine 101, which in a customary manner, via an output shaft 102 on the combustion engine 101, usually via a flywheel, is connected to a gearbox 103 via a clutch 106. The gearbox 103 is here illustrated schematically as one unit. However, the gearbox 103 may also physically consist of several cooperating gearboxes, for example a so-called range gearbox, a main gearbox and a split gearbox, which are arranged along the vehicle's power-train.

The vehicle 100 further comprises drive shafts 104, 105, which are connected to the vehicle's driving wheels 111, 112, and which are operated by an output shaft 107 from the gearbox 103, via a shaft gear 108, such as a customary differential shaft. The vehicle 100 also comprises additional wheels 113, 114, which may be driving or non-driving, and may be arranged for control of the vehicle.

The vehicle 100 also comprises various different brake systems 150. The brake systems 150 may comprise a customary service brake system, which may e.g. consist of wheel brakes 151, 152, 153, 154, comprising brake discs and/or brake drums with associated brake pads, or similar, arranged in connection with the vehicle's wheels 111, 112, 113, 114. The brake system 150 may also comprise one or several extra/auxiliary brakes, for example a brake 155 which acts on the vehicle's power-train, such as a retarder, an electromagnetic brake, a decompression brake, or an exhaust brake. A retarder may comprise one or several of a primary retarder, placed between the engine and the gearbox, and a secondary retarder, placed after the gearbox. An electromagnetic brake may be placed in any suitable place where it may act on the vehicle's power-train.

A decompression brake may be integrated in the engine. An exhaust brake uses a damper fitted in the exhaust outlet, in order to increase the engine's pump losses and thus its braking torque, to achieve a braking effect. The exhaust brake may be seen as integrated in the engine 101, or at least in the engine 101 and its exhaust treatment system 160. In this document, exhaust brakes and decompression brakes are comprised in the term engine fitted auxiliary brakes 156. Such engine fitted auxiliary brakes 156 are here arranged/fitted in connection with an exhaust stream from the engine 101 and are schematically drawn in the figure, at an exhaust treatment system 160 for the vehicle. However, in the present invention such engine fitted auxiliary brakes 156 may also be arranged substantially anywhere along the passage of the exhaust stream out from the engine 101 to, and through, the exhaust treatment system 160. In other words the engine fitted auxiliary brakes 156 are arranged upstream of the exhaust treatment system 160, at or downstream of the engine, and/or in the exhaust treatment system 160.

The brakes 155 acting on the power-train are here schematically drawn as though acting on the gearbox's output shaft 107. However, such brakes 155 may be arranged substantially anywhere along the vehicle's power-train, and may act substantially anywhere a braking effect may be achieved.

The engine 101 may be controlled based on instructions from a cruise control 120, in order to maintain an actual vehicle speed and/or to vary the actual vehicle speed, for example so that an optimised fuel consumption is obtained within reasonable speed limits.

The vehicle 100 also comprises at least one control device 130, arranged to control a range of different functions in the vehicle, such as among others the engine 101, the brake system 150 and the gearbox 103.

As described in further detail below, the system's control device 130 comprises a first determination unit 131, a second determination unit 132 and a utilization unit 133.

As a person skilled in the art will realize, the control device may also be installed to control one or several further units in the vehicle, such as for example the clutch 106 and/or the gearbox 103 (not displayed in the figure).

In the figure, the at least one control device 130 is drawn as being separate from the cruise control 120. However, the control device 130 and the cruise control 120 may exchange information with each other. The cruise control 120 and the control device 130 may also be logically separate, but physically implemented in the same unit, or may be logically and physically jointly arranged/implemented.

In FIG. 2 an example of components comprised in an exhaust treatment system 160 are displayed. Such exhaust system 160 may for example consist of a so-called EuroVI-system, as illustrated in FIG. 2, but the present invention may be applied to substantially all types of exhaust treatment systems, in which one or several components comprised are impacted by temperature in some way.

In FIG. 2, the exhaust treatment system 160, with an exhaust pipe 202, is schematically connected to a combustion engine 101, wherein the exhausts generated during combustion, that is to say the exhaust stream 203, is indicated with arrows. The exhaust stream 203 is led to a diesel particulate filter (DPF) 220, via a diesel oxidation catalyst (DOC) 210. During the combustion in the combustion engine, soot particles are formed, and the particulate filter 220 is used to catch these soot particles. The exhaust stream 203 is here led through a filter structure, where soot particles are caught from the exhaust stream 203 passing through, and are stored in the particulate filter 220.

The oxidation catalyst DOC 210 has several functions and is normally used primarily to oxidise, at the exhaust purification, remaining hydrocarbons $C_xH_y$, and carbon monoxide CO in the exhaust stream 203 into carbon dioxide $CO_2$ and water $H_2O$. The oxidation catalyst 210 may also oxidise a large fraction of the nitrogen monoxides NO occurring in the exhaust stream into nitrogen dioxide $NO_2$. The oxidation of nitrogen monoxide NO into nitrogen dioxide $NO_2$ is important to the nitrogen dioxide based soot oxidisation in the filter, and is also advantageous at a potential subsequent reduction of nitrogen oxides $NO_x$.

For the reduction of nitrogen oxides $NO_x$ the exhaust treatment system 160 also comprises an SCR (Selective Catalytic Reduction) catalyst 230, downstream of the particulate filter DPF 220. SCR catalysts use ammonia $NH_3$, or a composition from which ammonia may be generated/formed, e.g. urea, as an additive for the reduction of nitrogen oxides $NO_x$ in the exhaust stream. The reaction rate of this reduction is impacted, however, by the ratio between nitrogen monoxide NO and nitrogen dioxide $NO_2$ in the exhaust stream, so that the reductive reaction is impacted in a positive direction by the previous oxidation of NO into $NO_2$ in the oxidation catalyst DOC.

As mentioned above, the SCR-catalyst 230 requires additives to reduce the concentration of for example nitrogen oxides $NO_x$ in the exhaust stream 203. Such additive is injected into the exhaust stream upstream of the SCR-catalyst 230 (not displayed in FIG. 2). This additive is, as mentioned above, often nitrogen- and/or urea-based and may consist of e.g. AdBlue, which basically consists of urea diluted with water. Urea forms ammonia at heating (thermolysis) and at heterogeneous catalysis on an oxidizing surface (hydrolysis), which surface may, for example, consist of titanium dioxide $TiO2$, within the SCR-catalyst. The exhaust treatment system may also comprise a separate hydrolysis catalyst.

The exhaust treatment system 160 may also be equipped with a slip-catalyst ASC 240, which is arranged to oxidise an excess of ammonia that may remain after the SCR-catalyst 230. Accordingly, the slip-catalyst ASC 240 may provide a potential for improving the system's total NOx-conversion/reduction.

The exhaust treatment system 160 may also be equipped with one or several sensors, such as one or several $NO_x$— and/or temperature sensors 261, 262, 263, 264 for the determination of nitrogen oxides and/or temperatures in the exhaust treatment system. The exhaust treatment system also comprises one or several pipe sections 202, through which the exhaust stream is transported between the components inside the exhaust treatment system, on their route from the engine and through the exhaust treatment system 160.

The performance of one or several of the components in the exhaust treatment system 160, that is to say one or several of the DOC-catalyst 210, the DPF-filter 220, the SCR-catalyst 230 and/or the ASC-catalyst 240, and all additional components that may be comprised in the exhaust treatment system, is contingent on temperature. For example, the SCR-catalyst operates most efficiently within a temperature interval of 300-450° C., and acceptably above the whole temperature interval 250-450° C. At a low temperature of the SCR-catalyst, the reduction of nitrogen oxides $NO_x$ is typically inefficient. Additionally, one or several of the other components in the exhaust treatment system 160 may have temperature intervals, within which they are used most efficiently. Therefore, it is important to be able to control the operating temperature for such components in the exhaust treatment system 160.

In this document, a temperature $T_{exhaust}$ for an exhaust treatment system 160 means a temperature in/at/for the exhaust stream through the exhaust treatment system 160. The components in the exhaust treatment system 160 will assume this temperature because of their heat exchange ability. For example, the substrate in the catalysts will assume the temperature of the exhaust stream because of their heat exchange ability.

FIG. 3 shows a flow chart for a method 300 according to the present invention. The method 300 achieves a control of at least one temperature $T_{exhaust}$ for an exhaust treatment system 160 in a vehicle by carrying out the method steps described below.

In a first step 301 of the method, at least one temperature $T_{exhaust}$ is determined for the exhaust treatment system 160. As described in detail below, this temperature $T_{exhaust}$ may for example be determined by way of measurement or estimation, where estimation may comprise calculation of the temperature $T_{exhaust}$ based on one or more variables.

In a second step 302 of the method an order of priority is determined for the use of brakes in the vehicle 100. The brakes in relation to which an order of priority is determined comprise at least service brakes and auxiliary brakes, where such auxiliary brakes comprise at least one engine fitted auxiliary brake 156, which is fitted in connection with an exhaust stream 203 through the exhaust treatment system 160. According to the present invention the order of priority is determined based on the at least one temperature $T_{exhaust}$, determined in the first step 301.

In a third step 303 of the method, the determined order of priority is used in connection with braking the vehicle 100.

Through the use of the present invention it is determined what brakes should be prioritized for use, when braking a vehicle based on the at least one temperature $T_{exhaust}$ for the exhaust treatment system. Accordingly, it is possible to control such at least one temperature $T_{exhaust}$ for the exhaust treatment system by suitably prioritizing the brakes. Therefore, the present invention may ensure that the exhaust treatment system and its component parts maintain a suitable operating temperature, so that an efficient exhaust purification is provided. For example, the at least one temperature $T_{exhaust}$ may be controlled so that the SCR-catalyst operates within an efficient temperature interval, for example 250-450° C., and preferably 300-450° C. For temperatures below the efficient temperature interval, the reduction provided by the SCR-catalyst is typically inefficient and for high temperatures there is a risk that the SCR-catalyst may be damaged, for example by melting.

The present invention may use the energy consumed at braking by the vehicle to heat one or several temperature-dependent components in the exhaust treatment system, since the at least one engine fitted auxiliary brake 156 may be prioritized so that it is used a lot in connection with braking. The at least one engine fitted auxiliary brake 156 is fitted in connection with an exhaust stream from the engine 101 in the vehicle, and may thus impact the temperature of the exhaust stream by partly cutting the exhaust flow, creating heat. A use of the at least one engine fitted auxiliary brake may thus, by heating the exhaust stream, increase the at least one temperature $T_{exhaust}$ for the exhaust treatment system 160.

According to one embodiment, the value for the at least one temperature $T_{exhaust}$ is determined based on measurement of a temperature $T_{exhaust\_measure}$ for the exhaust treatment system. According to another embodiment, the temperature $T_{exhaust}$ is determined by way of estimation, wherein the estimation consists of a calculation of the temperature $T_{exhaust}$ based on one or several variables, for example based on one or several of engine torque, engine speed, exhaust flow, ambient temperature, engine temperature, and the temperature of other components in the engine and/or exhaust treatment system.

According to one embodiment the determination of the order of priority and/or the use of the at least one engine fitted auxiliary brake is limited to the exhaust stream, which passes through the exhaust treatment system, obtaining a favorable exhaust flow and/or a favorable exhaust stream temperature $T_{exhaust\_stream}$ by way of braking with the at least one engine fitted auxiliary brake, in order to achieve the desired at least one temperature $T_{exhaust}$. In other words, according to one embodiment braking with the at least one engine fitted auxiliary brake is carried out only if the braking may provide the desired heating of at least one component in the exhaust treatment system. Thus, inconsistent control of braking in the vehicle is avoided.

Additionally, it is important that the total braking force resulting from the braking does not exceed a braking force in the vehicle requested by for example a driver, a cruise control unit or a constant speed brake. The control of the at least one temperature $T_{exhaust}$ is therefore carried out only in such a way that a provided total braking force achieved by the brakes in the vehicle is lower than a requested total braking force for a present driving situation.

In order to ensure that this is the case, measures, where they are comprised in the control of the at least one temperature $T_{exhaust}$ for an exhaust treatment system, are disqualified where they result in the total braking force provided exceeding the requested total braking force. For example, one or several suggested orders of priority for the use of brakes may thus be disqualified if they provide too great a total braking force.

The control of the at least one temperature $T_{exhaust}$ for the exhaust treatment system may, according to one embodiment, result in an increase of the at least one temperature $T_{exhaust}$ through an increased use of the at least one engine fitted auxiliary brake 156. According to this embodiment the order of priority is determined in such a way that the at least one engine fitted auxiliary brake 156 is prioritized over other brakes in the vehicle, that is to say it is prioritized over both service brakes and other auxiliary brakes, if the at least one temperature $T_{exhaust}$ is below a minimum temperature threshold value $T_{min}$. Since the at least one engine fitted auxiliary brake 156 is prioritized, it will also be used before other brakes are used, which means that the at least one engine fitted auxiliary brake 156 will be used more than other brakes in the vehicle. Accordingly, a temperature increase of the at least one temperature $T_{exhaust}$ for the exhaust treatment system and/or its components is achieved, since the increased use of the at least one engine fitted auxiliary brake 156 provides a temperature increase for the exhaust stream, and hence for the exhaust treatment system and/or its components.

The minimum temperature threshold value $T_{min}$ may for example have a value which is related to the temperature at which it was considered, in prior art solutions, that fuel consuming heating actions of exhaust treatment systems were required, which may be within an interval of approximately 150-300° C., and preferably within an interval of approximately 250-300° C.

According to one embodiment, the control of the at least one temperature $T_{exhaust}$ for the exhaust treatment system may also result in a reduction of the at least one temperature $T_{exhaust}$ through the use of a suitable order of priority, which results in a lesser use of the at least one engine fitted auxiliary brake. Here, the order of priority may thus be determined so that the at least one engine fitted auxiliary brake has a lower priority than the other brakes in the vehicle, if the at least one temperature $T_{exhaust}$ is higher than a maximum temperature threshold value $T_{max}$. This order of priority then provides a temperature reduction of the at least one temperature $T_{exhaust}$ for the exhaust treatment system and/or its components, since the reduced use of the at least one engine fitted auxiliary brake counteracts a temperature increase for the exhaust stream, and accordingly for the exhaust treatment system and/or its components.

The maximum temperature threshold value $T_{exhaust}$ may for example have a value which is related to a temperature at which the components of the exhaust treatment system, such as the SCR-catalyst, may be damaged, and/or a temperature at which the conversion rate for the SCR-catalyst drops, which may be within the interval 450-700° C. and preferably 500-550° C.

According to one embodiment, the control of the at least one temperature $T_{exhaust}$ for the exhaust treatment system 160 may provide a moderate increase of the at least one temperature $T_{exhaust}$, since the at least one engine fitted auxiliary brake 156 is prioritized over other brakes in the vehicle, while at the same time no shifting occurs in the gearbox if the at least one temperature $T_{exhaust}$ is lower than a first minimum temperature threshold value $T_{min\_same\_gear}$. Here, a previously used gear position is thus maintained, and the at least one engine fitted auxiliary brake has the highest priority, while a moderate increase of the at least one temperature $T_{exhaust}$ is obtained. In other words, an order of priority with the highest priority for the at least one engine fitted auxiliary brake may be determined here, and applied if the minimum temperature threshold value $T_{min}$ corresponds to a first minimum temperature value $T_{min\_same\_gear}$; $T_{min}=T_{min\_same\_gear}$; where the first minimum temperature threshold value $T_{min\_same\_gear}$ has a value determined with respect to the fact that no shifting of gears occurs in a gearbox 103 in the vehicle, that is to say that the vehicle continues to be driven with the use of the same gear, which was used before the use of the order of priority.

It should be noted that increases/decreases of the at least one temperature $T_{exhaust}$, which are described in this document as a result of the invention, constitute relative increases/decreases, that is to say increases/decreases compared to where the control, according to the invention, of the at least one temperature $T_{exhaust}$ by way of selection of the order of priority for the brakes would have been deactivated. In other words, these relative increases/decreases may result in greater increases/decreases than increases/decreases produced by prior art methods. This also means, for example, that a relative increase, according to the invention described in this document, of the at least one temperature $T_{exhaust}$ may constitute an actual reduction of the at least one temperature $T_{exhaust}$, but that the at least one temperature $T_{exhaust}$ at such actual reduction is reduced less than it would have been with the invention deactivated and/or through the use of prior art solutions. Similarly, this means, for example, that a relative reduction of the at least one temperature $T_{exhaust}$, which occurs with the use of the invention, may constitute an actual increase of the at least one temperature $T_{exhaust}$, but that the at least one temperature $T_{exhaust}$ at such factual increase increases less than it would have done if the invention were deactivated and/or with the use of prior art solutions.

According to one embodiment of the present invention, shifting gears, that is to say gear changes in the gearbox 103, may be used in combination with the use of the determined order of priority to control the at least one temperature $T_{exhaust}$. The gear used impacts the flow through the engine, and accordingly the flow in the exhaust stream. This means that mass flow in the exhaust stream may be controlled by controlling the shifts of the gearbox. For example, a downshift results in an increased mass flow, and a faster heating of the exhaust treatment system, if the exhaust stream is warmer than the exhaust treatment system $T_{exhaust}$. Similarly, for example an up-shift provides a reduced mass flow and a slower heating, if the exhaust stream is warmer than the exhaust treatment system $T_{exhaust}$.

The gear selection may then be carried out by determining a suitable flow through the exhaust treatment system, based on the at least one temperature $T_{exhaust}$. Subsequently, a gear selection is made in the gearbox 103 during the deceleration, which is carried out according to the determined order of priority. Such gear selection is carried out here based on the determined suitable flow.

Accordingly, thus both the temperature and the mass flow for the exhaust stream may be controlled by using a suitable combination of gear positions in the gearbox 103, and an order of priority for the use of the brakes. A very accurate and flexible control of the at least one temperature $T_{exhaust}$ may thus be obtained.

If the exhaust treatment system 160, or at least one component in the exhaust treatment system, has too low a temperature to be able to purify the exhausts efficiently, the at least one temperature $T_{exhaust}$ may be increased by way of these measures.

For example, control of the at least one temperature $T_{exhaust}$ may provide a moderate increase of the at least one temperature $T_{exhaust}$, since the at least one engine fitted auxiliary brake 156 is prioritized over other said brakes, and since an up-shift is carried out in the gearbox 103 if the at least one temperature $T_{exhaust}$ is lower than a second minimum temperature threshold value $T_{min\_up\_gear}$. The moderate increase may here be within the interval 10-30° C., which may be due to among others the starting temperature and the length of the braking process.

Control of the at least one temperature $T_{exhaust}$ may also result in a powerful increase of the at least one temperature $T_{exhaust}$, since the at least on engine fitted auxiliary brake 156 is prioritized over the other brakes, and since a down-shift is carried out in the gearbox 103 if the at least one temperature $T_{exhaust}$ is below a third minimum temperature threshold $T_{min\_down\_gear}$.

If the exhaust treatment system 160, or at least one component in the exhaust treatment system, instead has too high a temperature, which may impact the exhaust treatment system negatively and/or may be harmful to the components of the exhaust treatment system, the at least one temperature $T_{exhaust}$ may, in a similar way, be reduced by way of prioritizing the brakes and gear shifts.

For example, the control of the at least one temperature $T_{exhaust}$ may provide a moderate reduction of the at least one temperature $T_{exhaust}$, since the at least one engine fitted auxiliary brake 156 is prioritized lower than the other brakes, if the at least one temperature $T_{exhaust}$ is higher than a first maximum temperature threshold value $T_{max\_same\_gear}$. The moderate decrease may here be within the interval 20-40° C., which may be due to among others the starting temperature and the length of the braking process.

The control of the at least one temperature $T_{exhaust}$ may also provide a moderate decrease of said at least one temperature $T_{exhaust}$, since the at least one engine fitted auxiliary brake 156 is prioritized lower than the other brakes, and by way of an up-shift carried out in the gearbox 103, if the at least one temperature $T_{exhaust}$ is higher than a second maximum temperature threshold value $T_{max\_up\_gear}$. The moderate decrease may here be within the interval 30-50° C., which may be due to among others the starting temperature and the length of the braking process.

The control of the at least one temperature $T_{exhaust}$ may also provide a powerful decrease of said at least one temperature $T_{exhaust}$ by prioritizing the at least one engine fitted auxiliary brake 156 lower than the other brakes, and by way of a down-shift carried out in the gearbox 103, if the at least one temperature $T_{exhaust}$ for the exhaust treatment system 160 is higher than a third maximum temperature threshold value $T_{max\_down\_gear}$. The powerful decrease may here be within the interval 40-70° C., which may be due to among others the starting temperature and the length of the braking process.

In this document, the first minimum temperature threshold value $T_{min\_same\_gear}$, the second minimum temperature threshold value $T_{min\_up\_gear}$ and/or the third minimum temperature threshold value $T_{min\_down\_gear}$ may have a value which is related to the SCR-catalyst's suitable temperature operating range, that is to say 250-450° C. and preferably 300-450° C., and which may be within an interval that is determined by how far away from such suitable temperature operating range the at least one temperature $T_{exhaust}$ is at a given point in time.

Similarly, in this document, the first maximum temperature threshold value $T_{max\_same\_gear}$, the second maximum temperature threshold value $T_{max\_up\_gear}$ and/or the third maximum temperature threshold value $T_{max\_down\_gear}$ may have a value which is related to the SCR-catalyst's suitable temperature operating range, that is to say 250-450° C. and preferably 300-450° C., and which may be within an interval that is determined by how far from this suitable temperature operating range the at least one temperature $T_{exhaust}$ is at a given point in time. As described above gear shifts, that is to say gear changes in the gearbox 103, may be used to control the at least one temperature $T_{exhaust}$. The gear used impacts the flow through the engine, and accordingly the flow in the exhaust stream, so that the mass flow in the exhaust stream may be controlled by controlling gear shifts in the gearbox. For example, a down-shift results in an increased mass flow, and a faster heating of the exhaust treatment system, if the exhaust stream is warmer than the exhaust treatment system $T_{exhaust}$. Similarly, for example an up-shift provides a reduced mass flow and a slower heating, if the exhaust stream is warmer than the exhaust treatment system $T_{exhaust}$. It should be realized that, if for example the exhausts are colder than the temperature $T_{exhaust}$ for the exhaust treatment system, a continued use of a previously used gear, even without any special prioritisation of braking according to the present invention, provides a cooling of the exhaust treatment system and its components. If, additionally, a down-shift is carried out, the cooling becomes stronger.

A person skilled in the art will realize that a method for control of a temperature $T_{exhaust}$ for an exhaust treatment system according to the present invention, may also be implemented in a computer program, which when executed in a computer will cause the computer to carry out the method. The computer program usually forms a part of a computer program product 403, where the computer program product comprises a suitable non-volatile/permanent/durable/permanent digital storage medium on which the computer program is stored. Said non-volatile/permanent/durable/permanent computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk unit, etc.

FIG. 4 schematically shows a control device 400. The control device 400 comprises a calculation unit 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation unit 401 is connected to a memory unit 402 installed in the control device 400, providing the calculation unit 401 with e.g. the stored program code and/or the stored data, which the calculation unit 401 needs in order to be able to carry out calculations. The calculation unit 401 is also set up to store interim or final results of calculations in the memory unit 402.

Further, the control device 400 is equipped with devices 411, 412, 413, 414 for receiving and sending of input and output signals respectively. These input and output signals may contain wave shapes, pulses or other attributes, which may be detected as information by the devices 411, 413 for the receipt of input signals and may be converted into signals that may be processed by the calculation unit 401. These signals are then provided to the calculation unit 401. The devices 412, 414 for sending output signals are arranged to convert the calculation result from the calculation unit 401 into output signals for transfer to other parts of the vehicle's control system, and/or the component(s) for which the signals are intended.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation unit 401, and that the above-mentioned memory may consist of the memory unit 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than shown in FIGS. 1 and 4, as is well known to a person skilled in the art within the technology area.

The present invention, in the embodiment displayed, is implemented in the control device 400. The invention may, however, also be implemented wholly or partly in one or several other control devices already existing in the vehicle, or in a control device dedicated to the present invention.

According to one aspect of the present invention, a system is provided, arranged for the control of at least one temperature $T_{exhaust}$ for an exhaust treatment system 160 in a vehicle. The system comprises a first determination unit 131, which is arranged for the determination 301 of the at least one temperature $T_{exhaust}$ for the exhaust treatment system 160.

The system also comprises a second determination unit 132, which is arranged for the determination 302 of an order of priority for the use of brakes in the vehicle 100. These brakes comprise at least the above described service brakes and auxiliary brakes, the auxiliary brakes in turn comprising at least one engine fitted auxiliary brake 156, which is fitted in connection with an exhaust stream 203 through the exhaust treatment system 160. The order of priority is here determined based on the at least one temperature $T_{exhaust}$, as described above.

The system also comprises a utilization unit 133, which is arranged for the use 302 of the determined order of priority at braking of the vehicle 100.

The utilization unit may, in different ways, ensure that the determined order of priority is used at braking, and/or that other measures provided by the method according to the invention are used. The determined order of priority and/or the other measures may for example be used through settings in one or several control systems in the vehicle. Such systems may comprise for example control systems which control braking, such as cruise control or constant speed brake systems. The determined order of priority and/or the other measures may also be used by way of the driver of the vehicle being advised to use the order of priority and/or the other measures, following which the driver may make an active selection to use or not to use the order of priority and/or the other measures. The instruction to the driver may be provided by way of an indication of some type, such as for example through a lamp, an instrument, a sound, a display or similar. The driver may then via a suitable input device, such as a push-button, a knob, a touch-screen or similar, make his or her active selections.

A driver-activated braking is typically controlled with a brake pedal, a brake lever or another brake control element. However, the above described settings for the braking may impact the result of the driver-activated braking.

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention relates to a motor vehicle 100, for example a truck or a bus, comprising at least one system for the control of at least one temperature $T_{exhaust}$ for an exhaust treatment system.

The present invention is not limited to the embodiments of the invention described above, but relates to and comprises all embodiments within the scope of the enclosed independent claims.

The invention claimed is:

1. A method for control of at least one temperature $T_{exhaust}$ for an exhaust treatment system in a vehicle said method comprising:
   determining at least one temperature $T_{exhaust}$ for said exhaust treatment system;
   determining an order of priority for the use of brakes in said vehicle, wherein said brakes comprise at least service brakes and auxiliary brakes, wherein said auxiliary brakes comprise at least one engine fitted auxiliary brake, which is fitted in connection to an exhaust stream through said exhaust treatment system, and wherein said order of priority is determined based on said at least one temperature $T_{exhaust}$ for said exhaust treatment system; and determining said order of priority at braking of said vehicle.

2. The method according to claim 1, wherein said order of priority is determined in such a way that said at least one engine fitted auxiliary brake is prioritized over other said brakes, if said at least one temperature $T_{exhaust}$ for said exhaust treatment system is below a minimum temperature threshold value $T_{min}$.

3. The method according to claim 1, wherein said order of priority is determined in such a way that said at least one engine fitted auxiliary brake is prioritized lower than the other said brakes, if said at least one temperature $T_{exhaust}$ for said exhaust treatment system is higher than a maximum temperature threshold value $T_{max}$.

4. The method according to claim 1, wherein said order of priority indicates that an auxiliary brake with higher priority is used before another of said brakes with lower priority.

5. The method according to claim 1, wherein said method comprises:

determining a suitable flow through said exhaust treatment system, based on said at least one temperature $T_{exhaust}$ for said exhaust treatment system; and performing a gear selection in a gearbox in said vehicle during said braking, wherein said gear selection is carried out based on said suitable flow.

6. The method according to claim 5, wherein a higher used gear in said gearbox provides a lower flow through said exhaust treatment system, than does a lower used gear in said gearbox.

7. The method according to claim 5, wherein the determined order of priority of use of said brakes and the performance of said gear selection are used to control said at least one temperature $T_{exhaust}$ for said exhaust treatment system.

8. The method according to claim 1, wherein said control of said at least one temperature $T_{exhaust}$ for an exhaust treatment system achieves a reduction of said at least one temperature $T_{exhaust}$ by prioritizing said at least one engine fitted auxiliary brake lower than the other said brakes, if said at least one temperature $T_{exhaust}$ for said exhaust treatment system is higher than a first maximum temperature threshold value $T_{max\_same\_gear}$.

9. The method according to claim 8, wherein said reduction of said at least one temperature $T_{exhaust}$ is a relative decrease, which constitutes a decrease compared to if said control of said at least one temperature $T_{exhaust}$ for an exhaust treatment system would have been deactivated.

10. The method according to claim 1, wherein said control of said at least one temperature $T_{exhaust}$ for an exhaust treatment system achieves a decrease of said at least one temperature $T_{exhaust}$, since said at least one engine fitted auxiliary brake is prioritized lower than the other said brakes, and since an up-shift is carried out in a gearbox in said vehicle, if said at least one temperature $T_{exhaust}$ for said exhaust treatment system is higher than a second maximum temperature threshold value $T_{max\_up\_gear}$.

11. The method according to claim 1, wherein said control of said at least one temperature $T_{exhaust}$ for an exhaust treatment system achieves a reduction of said at least one temperature $T_{exhaust}$ by prioritizing said at least one engine fitted auxiliary brake lower than the other said brakes, and by carrying out a down-shift in a gearbox in said vehicle, if said at least one temperature $T_{exhaust}$ for said exhaust treatment system is higher than a third maximum temperature threshold value $T_{max\_down\_gear}$.

12. The method according to claim 1, wherein said control of said at least one temperature $T_{exhaust}$ for an exhaust treatment system achieves an increase of said at least one temperature $T_{exhaust}$ by prioritizing said at least one engine fitted auxiliary brake higher than the other said brakes, if said at least one temperature $T_{exhaust}$ for said exhaust treatment system is lower than a first minimum temperature threshold value $T_{min\_same\_gear}$.

13. The method according to claim 12, wherein said increase of said at least one temperature $T_{exhaust}$ is a relative increase, which constitutes an increase compared to if said control of said at least one temperature $T_{exhaust}$ for an exhaust treatment system had been deactivated.

14. The method according to claim 1, wherein said control of said at least one temperature $T_{exhaust}$ for an exhaust treatment system achieves an increase of said at least one temperature $T_{exhaust}$ by prioritizing said at least one engine fitted auxiliary brake higher than the other said brakes, and by carrying out an up-shift in a gearbox in said vehicle, if said at least one temperature $T_{exhaust}$ for said exhaust treatment system is lower than a second minimum temperature threshold value $T_{min\_up\_gear}$.

15. The method according to claim 1, wherein said control of said at least one temperature $T_{exhaust}$ for an exhaust treatment system achieves an increase of said at least one temperature $T_{exhaust}$ by prioritizing said at least one engine fitted auxiliary brake higher than the other said brakes, and by carrying out a down-shift in a gearbox in said vehicle, if said at least one temperature $T_{exhaust}$ for said exhaust treatment system is lower than a third minimum temperature threshold value $T_{min\_down\_gear}$.

16. The method according to claim 1, wherein said use of said engine fitted auxiliary brake during said braking increases said at least one temperature $T_{exhaust}$, by way of heating of said exhaust treatment system.

17. The method according to claim 1, wherein said braking of said vehicle comprises an active use by a driver and/or a control system of one or several of:

a wheel brake; and an auxiliary brake.

18. The method according to claim 17, wherein said auxiliary brake comprises one or several from among the group:

a retarder;

said engine fitted auxiliary brake; and an electromagnetic brake.

19. The method according to claim 1, wherein said engine fitted auxiliary brake comprises one or several of:

an exhaust brake; and a decompression brake.

20. The method according to claim 1, wherein said determination of said at least one temperature $T_{exhaust}$ is carried out based on at least one estimation of a temperature $T_{exhaust\_measure}$ for said exhaust treatment system.

21. The method according to claim 1, wherein said determination of said at least one temperature $T_{exhaust}$ is carried out, based on at least one measurement of a temperature $T_{exhaust\_measure}$ for said exhaust treatment system.

22. The method according to claim 1, wherein use said at least one engine fitted auxiliary brake is carried out only if such use results in said exhaust stream obtaining a favorable exhaust flow and/or a favorable exhaust flow temperature $T_{exhaust\_stream}$ for said at least one temperature $T_{exhaust}$.

23. The method according to claim 1, wherein said control of at least one temperature $T_{exhaust}$ for an exhaust treatment system is carried out only in such a way that a total provided braking force achieved by said brakes in said vehicle is below a requested total braking force.

24. The method according to claim 23, wherein measures comprised in said control of at least one temperature $T_{exhaust}$ for an exhaust treatment system, resulting in said total provided braking force exceeding said requested total braking force, are disqualified at said control.

25. A computer program product for control of at least one temperature $T_{exhaust}$ for an exhaust treatment system in a vehicle, wherein the computer program product is stored in a non-transitory computer-readable medium and comprises computer-readable program code portions embodied therein, the computer-readable program code portions configured to cause an electronic processor to:

determine at least one temperature $T_{exhaust}$ for said exhaust treatment system;

determine an order of priority for the use of brakes in said vehicle, wherein said brakes comprise at least service brakes and auxiliary brakes, wherein said auxiliary brakes comprise at least one engine fitted auxiliary brake, which is fitted in connection to an exhaust stream through said exhaust treatment system, and wherein said order of priority is determined based on said at least one temperature $T_{exhaust}$ for said exhaust treatment system; and determine said order of priority at braking of said vehicle.

26. A system arranged for control of at least one temperature $T_{exhaust}$ for an exhaust treatment system in a vehicle, said system comprising:

a first determination unit arranged for the determination of said at least one temperature $T_{exhaust}$ for said exhaust treatment system a second determination unit arranged for the determination of an order of priority for the use of brakes in said vehicle, wherein said brakes comprise at least service brakes and auxiliary brakes, wherein said auxiliary brakes comprise at least one engine fitted auxiliary brake, which is fitted in connection to an exhaust stream through said exhaust treatment system, and wherein said order of priority is determined based on said at least one temperature $T_{exhaust}$ for said exhaust treatment system; and a utilization unit arranged for use of said order of priority at braking of said vehicle.

* * * * *